(12) United States Patent
Bouvet et al.

(10) Patent No.: US 12,149,940 B2
(45) Date of Patent: Nov. 19, 2024

(54) WIRELESS COMMUNICATION METHOD BETWEEN A CLIENT OBJECT AND A SERVER OBJECT

(71) Applicant: ORANGE, Issy-les-Moulineaux (FR)

(72) Inventors: Eric Bouvet, Chatillon (FR); Thibaut Deshaies, Chatillon (FR); Fabrice Fontaine, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 392 days.

(21) Appl. No.: 17/642,095

(22) PCT Filed: Aug. 5, 2020

(86) PCT No.: PCT/FR2020/051436
§ 371 (c)(1),
(2) Date: Aug. 25, 2022

(87) PCT Pub. No.: WO2021/048478
PCT Pub. Date: Mar. 18, 2021

(65) Prior Publication Data
US 2022/0408264 A1 Dec. 22, 2022

(30) Foreign Application Priority Data

Sep. 11, 2019 (FR) ...................................... 1910005

(51) Int. Cl.
*H04L 29/06* (2006.01)
*H04W 12/122* (2021.01)
(Continued)

(52) U.S. Cl.
CPC ......... *H04W 12/122* (2021.01); *H04W 76/15* (2018.02); *H04W 76/30* (2018.02); *H04W 88/182* (2013.01)

(58) Field of Classification Search
CPC ... H04W 12/122; H04W 76/15; H04W 76/30; H04W 88/182; H04W 12/33; H04W 12/55; H04W 84/18
See application file for complete search history.

(56) References Cited

U.S. PATENT DOCUMENTS

2004/0203382 A1* 10/2004 Park ..................... H04L 65/1101
455/88
2007/0105542 A1* 5/2007 Friedman ................ H04W 4/00
455/420

(Continued)

FOREIGN PATENT DOCUMENTS

| CN | 105516975 B | 5/2019 |
|---|---|---|
| EP | 3128790 A1 | 2/2017 |
| EP | 3503666 A1 | 6/2019 |

OTHER PUBLICATIONS

International Search Report dated Sep. 8, 2020 for corresponding International Application No. PCT/FR2020/051436, Aug. 5, 2020.

(Continued)

*Primary Examiner* — Ka Shan Choy
(74) *Attorney, Agent, or Firm* — David D. Brush; Westman, Champlin & Koehler, P.A.

(57) ABSTRACT

A method for wireless communication between a client object and a server object. The method includes the implementation by a proxy of steps of: detecting advertising packets broadcast by the server object; establishing a first connection between the proxy and the server object so as to block the broadcasting by the server object of advertising packets, and retrieving identification information from the server object; and establishing a second connection between the proxy and the client object, by using as proxy identification information the retrieved identification information of (Continued)

Figure 1:
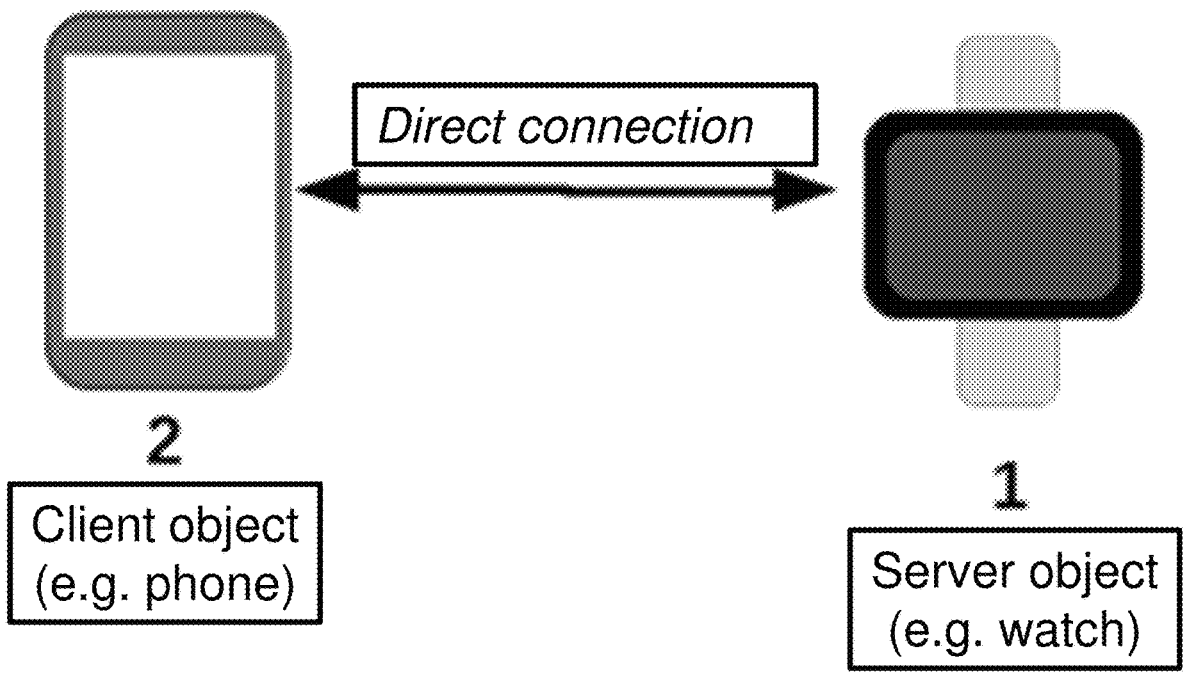

the server object, so as to simulate with the client object a connection with the server object.

10 Claims, 3 Drawing Sheets

(51) Int. Cl.
*H04W 76/15* (2018.01)
*H04W 76/30* (2018.01)
*H04W 88/18* (2009.01)

(56) References Cited

U.S. PATENT DOCUMENTS

| | | | |
|---|---|---|---|
| 2011/0103393 A1* | 5/2011 | Meier | H04W 88/16 370/401 |
| 2016/0191642 A1 | 6/2016 | Acar | |
| 2018/0063165 A1 | 3/2018 | Mankovskii et al. | |
| 2018/0132102 A1 | 5/2018 | Kwon et al. | |
| 2019/0069187 A1* | 2/2019 | Ashrafi | H04L 41/5054 |
| 2019/0246440 A1* | 8/2019 | Bae | H04W 8/005 |
| 2019/0357043 A1* | 11/2019 | Hu | H04L 9/0869 |
| 2020/0204946 A1* | 6/2020 | Kurabayashi | H04M 11/00 |
| 2020/0275394 A1* | 8/2020 | Lam | H04W 76/40 |

OTHER PUBLICATIONS

Written Opinion of the International Searching Authority dated Sep. 8, 2020 for corresponding International Application No. PCT/FR2020/051436, filed Aug. 5, 2020.
Radhika Goel et al., "Wireless Honeypot: Framework, Architectures and Tools", International Journal of Network Security, vol. 15, No. 5, Sep. 2013 (Sep. 2013), pp. 373-383, Retrieved from the Internet: URL:https://www.semanticscholar.org/paper/Wireless-Honeypot%3A-Framework%2C-Architectures-and-Goel-Sardana/2c9694ccf951705147e6fd2467a00d4f50e7a214, XP002799161.
English translation of the Written Opinion of the International Searching Authority dated Sep. 17, 2020 for corresponding International Application No. PCT/FR2020/051436, filed Aug. 5, 2020.

* cited by examiner

WIRELESS COMMUNICATION METHOD BETWEEN A CLIENT OBJECT AND A SERVER OBJECT

CROSS-REFERENCE TO RELATED APPLICATIONS

This Application is a Section 371 National Stage Application of International Application No. PCT/FR2020/051436, filed Aug. 5, 2020, which is incorporated by reference in its entirety and published as WO 2021/048478 A1 on Mar. 18, 2021, not in English.

GENERAL TECHNICAL FIELD

The present invention relates to a wireless communication method, particularly in accordance with the Bluetooth Low Energy protocol.

STATE OF THE ART

More and more connected objects have Bluetooth (BT) connectivity and particularly the version 4 or Low Energy (BLE).

This version of the Bluetooth standard provides the "air" emission by BLE peripherals of packets called advertising packets which are accessible by everyone, in response to which a gateway equipment sends a connection request to the peripheral, so as to authorize the establishment of the connection (for example with entry of a password of the peripheral on the gateway) and an exchange of data.

The problem is that this protocol is generally poorly monitored, whether at home or in a professional environment, and can therefore offer flaws to malicious third parties, although there are equipment authentication and data protection mechanisms in BLE:

Sensitive data can be sent in unsecured and therefore interceptable messages;
Many peripherals are pre-configured with default or trivial passwords (0000), or even without a password (automatic pairing), hence the risk of unsolicited connection with the gateway of a malicious third party;
Worse, BLE can be a discreet infection vector, a poorly monitored entrance to other networks. For example, recently discovered vulnerabilities (e.g. BleedingBit in 2019) allow, in response to advertising packets, sending "malicious" requests through which it is possible to take control of the peripheral and inject the code.

Although there are in practice solutions to all these difficulties, it is noted that the manufacturers sometimes partially use or not at all the state of the art of security on this protocol. In addition, security updates for the connected objects (correcting the vulnerabilities) are sometimes not possible or not maintained by the manufacturer.

It would thus be desirable to have a universal solution that allows increasing security and protecting all vulnerable BLE connected objects, regardless of the age and capabilities of these characters.

PRESENTATION OF THE INVENTION

The present invention thus relates, according to a first aspect, to a method for wireless communication between a client object and a server object, characterized in that it comprises the implementation by a gateway of steps of:
(a) Detecting advertising packets broadcast by said server object;
(b) Establishing a first connection between the gateway and said server object so as to block the broadcasting by said server object of advertising packets, and retrieving identification information from said server object;
(c) Establishing a second connection between the gateway and said client object, by using as gateway identification information said retrieved identification information from said server object, so as to simulate with the client object a connection with the server object.

The gateway thus interposed between a server object potentially presenting vulnerabilities and any client object thus cleverly serves as a proxy that allows preserving the server object from any attempt to exploit vulnerability without limiting its functionalities.

According to other advantageous and non-limiting characteristics:

The method comprises a step (d) of receiving from the client object a data request intended for the server object. Indeed, the gateway is presented as the server object, so that the client object does not know the difference and sends requests thereto thinking it is sending them to the server object.

The method comprises a step (e) of forwarding said request to the server object, receiving from the server object a response to said request intended for the client object, and forwarding said response to the client object. This allows normal operation of the server object, the gateway passing the requests and their responses transparently.

Step (d) comprises the verification that said request is not malicious, step (e) being implemented only if the request is not malicious, the method otherwise comprising a step (e') of interrupting the second connection. The present method thus allows sorting very effectively between the well-intentioned client objects and those seeking to take advantage of possible vulnerabilities of the server object.

Step (e') comprises the registration of the client object in a blacklist. The fraudulent client objects can thus be banned.

Said wireless communication complies with the Bluetooth Low Energy (BLE) protocol, so that said first connection and second connection are BLE connections. This is indeed a protocol particularly adapted to the present method.

Step (b) comprises the search for possible vulnerabilities at the level of said server object. This allows, before any attempt to connect a client object, assessing the risks and anticipating the threats that the server object may face.

Step (c) comprises the prior broadcasting of advertising packets from said server object. Thus, the gateway allows searching for client objects exactly as the server object would, so as to completely delude the client objects.

Said advertising packets broadcast by the gateway in step (c) are modified so as to be representative either of an absence of vulnerabilities, or of additional vulnerabilities. Thus, the gateway can discourage the fraudulent connections and attract them at the same time (honeypot mode).

According to a second aspect, a gateway for wireless communication between a client object and a server object is proposed, characterized in that it comprises a data processing module configured to:
Detect advertising packets broadcast by said server object;
Establish a first connection between the gateway and said server object so as to block the broadcasting by said server object of advertising packets, and retrieve identification information from said server object;
Establish a second connection between the gateway and said client object, by using as gateway identification information said retrieved identification information from said server object, so as to simulate with the client object a connection with the server object.

According to third and fourth aspects, there are proposed a computer program product comprising code instructions for the execution of a method, according to the first aspect, for wireless communication between a client object and a server object; as well as a storage medium readable by computer equipment on which a computer program product comprises code instructions for the execution of a method, according to the first aspect, for wireless communication between a client object and a server object.

PRESENTATION OF THE FIGURES

Figure 2:
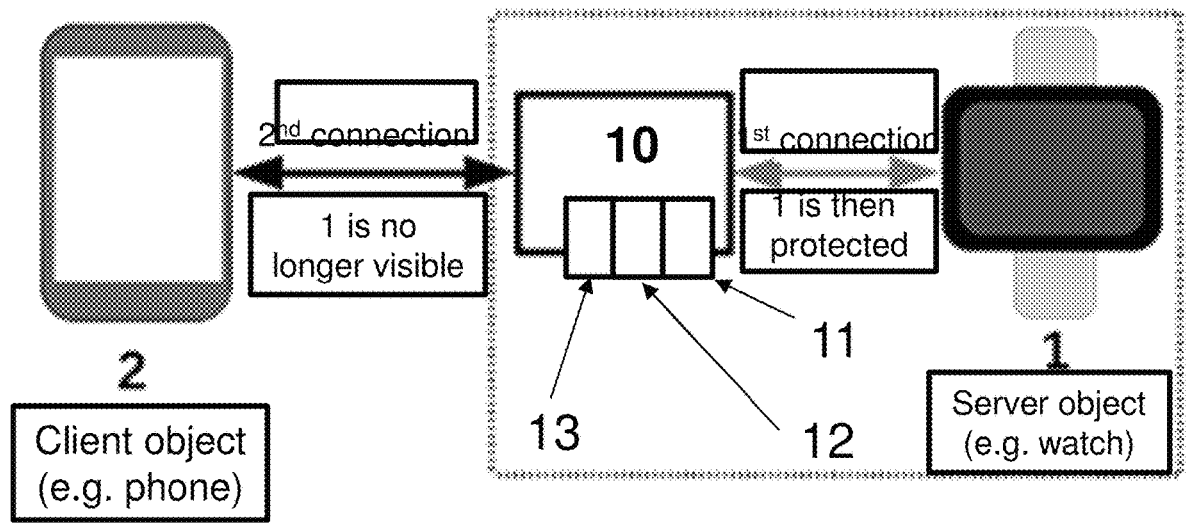
Figure 3:
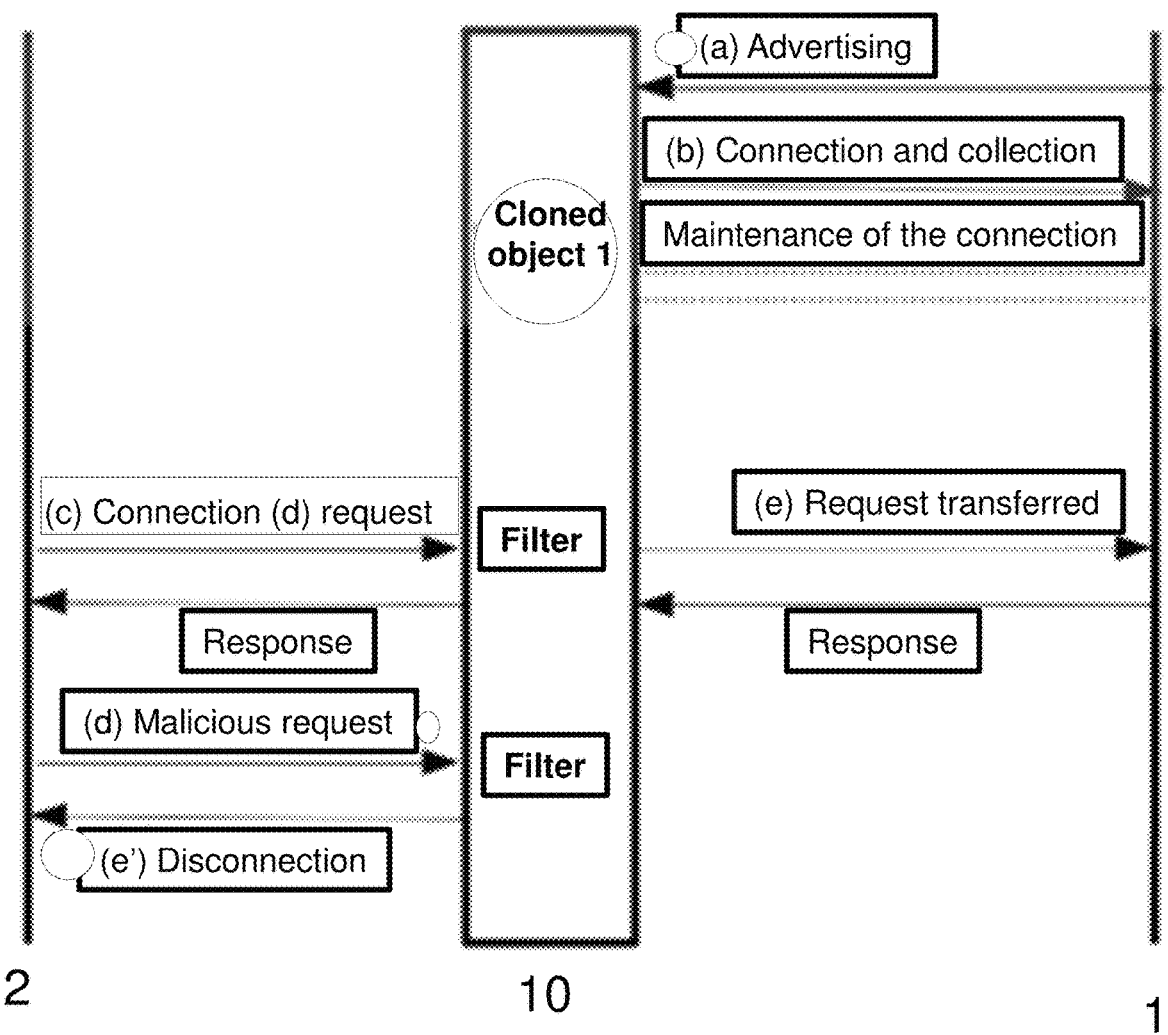

Other characteristics and advantages of the present invention will appear upon reading the following description of one preferred embodiment. This description will be given with reference to the appended figures, wherein:

FIG. 1 schematically represents a direct BLE communication between a server object and a client object in accordance with the prior art;

FIG. 2 represents an indirect BLE communication between a server object and a client object in accordance with the method according to the invention;

FIG. 3 schematically represents the steps of one preferred embodiment of the method according to the invention.

DETAILED DESCRIPTION

Connected Objects

The method according to the invention is a communication method between two connected objects 1, 2 that can be connected conventionally in the manner illustrated by FIG. 1 (which represents the prior art). As explained, this communication takes place wirelessly, by emission of radio waves. Said communication preferably uses the Bluetooth protocol, preferably Low Energy (BLE) protocol. Alternatively, it may be in accordance with the DECT ULE (the Ultra Low Energy extension of the DECT, "Digital Enhanced Cordless Telecommunications", standard) ZWave, protocol etc., and in general any radio-wave short-range wireless protocol known to the person skilled in the art, but in the rest of the present description, the preferred example of BLE will be taken. The person skilled in the art will know how to transpose the invention accordingly.

It is thus assumed that said connected objects 1, 2 are compatible BLE. The first connected object 1 is called server object or Bluetooth Smart Ready, and the second connected object is called client object or Bluetooth Smart. These server/client terms are typically understood within the meaning of the GATT (Generic Attribute Profile) layer of the BLE protocol, which defines how the data are organized and exchanged. Indeed, it is arbitrarily assumed that the purpose of said communication is to exchange data from the server equipment 1 to the client equipment 2.

Most often, the server object 1 has a "slave" role and the client object 2 has a "master" role as traditionally defined in the Bluetooth protocol from the outset (there is also the "central" equipment terminology to designate the master and the "peripheral" equipment terminology to designate the slave), the master being the equipment responsible for the synchronization of the equipment, the slave undergoing it.

Indeed, it is classical that it is desired to send data from the master to the slave, i.e. the slave provides the data, hence its server function.

Preferably, the client object 2 (master) is thus an autonomous main equipment such as a mobile terminal of the smartphone type, a touch pad, a computer, etc., and the server object 1 (slave) is a secondary equipment providing data such as a connected watch, a remote control, a keyboard, a mouse, a webcam, a tag, various sensors (home automation, weather, body, etc.). In general, a server object 1 is pre-configured, little or not updatable, and therefore has unresolved vulnerabilities.

In the rest of the present description, the illustrative example will be taken in which the server object 1 is a connected watch and the client object 2 a smartphone mobile terminal.

It will be noted that there may be several server and/or client objects 1, 2, particularly several "pairs" of a client object 2 and a server object 1.

Gateway

Referring to FIG. 2, the present method involves a third connected object 10, called gateway, via which the connected objects 1 and 2 will be connected as will be presented. By gateway or proxy, it is meant an object able to play an intermediary role between the connected objects 1 and 2. More specifically, while the client and server objects 1, 2 should normally connect directly in the conventional way represented in FIG. 1, the present method proposes to interpose the gateway 10 between these connected objects 1, 2.

The gateway 10 can be any piece of equipment having at least the functionalities of a client object, and advantageously a piece of equipment free of vulnerabilities, and for this capable of integrating the latest "security patches" by an update method (typically an operator equipment connected to the Internet network). As such, the gateway 10 comprises a data processing module 11 of the processor type, where appropriate a memory 12, a man-machine interface 13, etc.

The gateway 10 is thus for example another mobile terminal, an Internet connection box, a router, etc. It should be noted that the equipment of this type is generally the subject of permanent firmware updates (where appropriate downloaded and installed automatically), so that they are generally much better protected against the vulnerabilities than server objects 1.

In any case, it will be understood that the present method is not limited to some connected objects 1, 2, 10 and it suffices that these have wireless connectivity.

It will just be noted that there can also be several gateways 10 communicating with each other (for example a local ethernet network).

Method

The present method is implemented by the gateway 10 (or rather its data processing module 11). Thus, all the steps which will now be described will be presented with respect to the gateway 10.

Referring to FIG. 3, in a first step (a), the gateway 10 detects advertising packets broadcast by said server object 1.

By advertising packets, it is meant "advertising" packets sent to the air and accessible to everyone (these packets are broadcast and not directed to a particular recipient) in accordance with what is provided in particular by the BLE protocol. More specifically, these packets sent periodically make the server object 1 detectable, this means that it is "pairable" and that any "observer" object equipped with a BLE adapter is capable of receiving and reading them. The fact for a client object of listening whether there are broadcast advertising packets is called discovery.

The advertising packets contain generic presentation data of the server equipment 1 having broadcast them, such as "flags" signifying the capacities of the server object 1, lists of adopted services, etc. The payload of an advertising packet can be up to 31 bytes in size.

Then, in a second step (b), the gateway 10 establishes a connection, called first connection, between the gateway 10 and the said server object 1.

More specifically, in accordance in particular with the BLE protocol, this step typically comprises, in response to receiving an advertising packet, the emission by the gateway 10 of a connection request intended for the server object 1 (it is indeed a directed sending and no longer a broadcasting). After receiving this connection request, the server object 1 considers itself paired with the gateway 10, and stops broadcasting advertising packets.

It is thus understood that as long as this first connection is active, this has the effect of blocking the broadcasting by said server object 1 of advertising packets, so that the server object 1 is not declared, which makes it "hidden" (it is no longer visible for example from the client object 2 even in discovery). In addition, the gateway 10 retrieves identification information from said server object 1 now that the connection is established, this identification information being for example a unique initiator UUID of the server object 1. In practice, these information may be required along with the connection.

Said first connection is preferably maintained for as long as possible, so as to protect the server object 1 which, again, is potentially vulnerable.

To know for sure, the gateway 10 can, during step (b), search for possible vulnerabilities at the level of said server object 1. By vulnerability, it is meant any weakness of the wireless communication protocol as implemented by the server object (i.e. in the version as implemented by the server object) allowing an attacker to interfere with the integrity of its operation, particularly a BLE vulnerability.

This search can be done in different ways, and for example the gateway can:
- use attack scripts to detect known vulnerabilities called CVE (Common Vulnerabilities and Exposures, for example Blueborne, Bleeding Bit, etc., for BLE) vulnerabilities;
- detect the use of unsecured connection modes (Just Works pairing without password, pairing with default or trivial passwords, detection of absence of anti-brute force mechanism, verification of the absence of advertising packets once a connection is established, etc.); and/or
- check the absence of sensitive data in unsecured messages such as the advertising packets or GATT connections themselves unsecured (for example a gateway 10 is capable of determining whether the server object 1 makes its WiFi key accessible since it knows it, the same goes for other sensitive data such as a username password, a position, etc.)

It is repeated that, whether or not the server object 1 has vulnerabilities and whether or not these vulnerabilities are known, the existence of the first connection protects the server object 1 by exposing the gateway 10 in its place, which can itself be free of vulnerabilities if its firmware is up to date.

In a step (c), the gateway 10 establishes another connection, called second connection, between the gateway 10 and said client object 2. It should be noted that if there are several gateways 10, these (or at least those having received the advertising packets from the server object 1) can agree to decide which one connects here, this choice can be dynamic (if the server object 1 moves). It will be assumed in the remainder of the description that the gateway 10 involved in step (c) is determined.

The particularity is that the gateway 10 uses as identification information said retrieved identification information of said server object 1, so as to simulate with the client object 2 a connection with the server object 1.

In other words, the gateway duplicates (or "clones") the object identification of the server object 1, and thus the client object 2 connects to the gateway 10 by thinking it is connecting to the server object 1. It is understood that the server object 1 and the client object 2 remain connected, but indirectly via the gateway 10 acting as a proxy.

This second connection is again implemented in accordance with the standard, and can conventionally follow the broadcasting of advertising packets.

More specifically, step (c) may comprise the prior broadcasting, by the gateway, of advertising packets from said server object 1. Indeed, it is repeated that, due to the maintenance of the first connection, the server object 1 is inaccessible, and it is the gateway 10 that broadcasts the advertising packets by pretending to be the server object 1. Note that the broadcasting of the advertising packets can be "improved" by the gateway 10. For example, BLE provides 3 advertising channels, and if only one channel was used by the server object 1, the gateway 10 would correct that. In addition, the power and/or the frequency of emission of the advertising packets can be increased. Finally, the very content of the advertising packets can be modified in particular so as not to be representative of vulnerability (particularly any vulnerabilities detected in step (b)).

In any case, if a vulnerability (of the server object 1) has been detected in step (b), it is possible to condition the establishment of the second connection (i.e. the implementation of step (c)) with the agreement of the user. More specifically, the man-machine interface 13 can be used to notify the user that the server object 1 is vulnerable and that the client object 2 is trying to connect to it. Although, as will be seen, the present method allows even under these conditions a perfectly secure operation, the final decision to accept or not the connection can thus return to the user.

Secure Exchange of Data

Once the two connections have been established, with respect to the client object 2 it is in an ordinary wireless connection with the server object 1, so that the method can comprise a step (d) of receiving (always by the gateway 10) from the client object 2 of a data request (for example GATT) intended for the server object 1 (the client object 2 sends this request to the gateway 10 thinking it is sending it to the server object 1). For example, the client object 2 can request the values of quantities measured by sensors of the server object 1. Note that this request can accompany the connection request, so that steps (c) and (d) are concomitant.

Then the method can comprise a step (e) of forwarding said request to the server object 1 (which processes it), of receiving from the server object 1 a response to said request intended for the client object 2 (containing the requested data), and forwarding said response to the client object 2. Again, the client object 2 thinks that it is the server object 1 that responded to it directly. If there are several server and/or client objects 1, 2 connected via the gateway 10, the latter thus ensures the correct routing of the requests and their responses, so that each object 1, 2 has normal operation and is not even aware of the interposition of the gateway 10. A new request can then be received in a new occurrence of step (d), etc.

The advantage of the presence of the gateway 10 is that it is possible to filter the data requests. More specifically, step (d) may comprise the verification that said request is not malicious (i.e. does not attempt to exploit any vulnerability, this is also called "dangerous" request), step (e) then being implemented only if the request is not malicious, the method comprising otherwise (alternatively) a step (e') of interrupting the second connection, for security reasons.

In summary, the up-to-date gateway 10 is no longer sensitive to vulnerabilities, so that if it receives a malicious request on the one hand it will not be affected, and on the other hand it will be able to detect the danger that the client object 2 constitutes, whether the attempt to exploit a vulnerability is deliberate (malicious user of the client object 2) or results from an infection (a vulnerability is already exploited on the client object 2).

It should be noted that the step (e') of interrupting the second connection may further comprise the registration of the client object 2 in a blacklist, for example managed locally by the gateway 10, or even globally online (this may be a list shared between many gateways).

Other Functionalities

The presence of the gateway 10 has other advantages. First of all, it can be used to "unlock" the server object 1, particularly for a determined period, if necessary under user control.

Furthermore, some very simple server objects 1 have repeated standby periods, and the gateway 10 can be used during these standby times to send back data of the previous communications (in cache), this is referred to as shadow mode. More specifically, the gateway 10 will directly process a request received while the server object 1 is on standby. Then, step (e) will directly see the generation by the gateway 10 of a response to the data request received in step (d) (instead of transmitting it to the server object 1), then the simple transmission of said response to the client object 2. For example, if the server object 1 is a thermometer which every minute is activated for one second to give the temperature, during the 59 seconds of standby, the gateway 10 will respond to a temperature request with the last known temperature.

According to another variant which can be in addition to or alternatively to the previously described variants, the gateway 10 can make the server object 1 accessible via the internet by simulating another second connection. This is called about MESH-over-IP.

Furthermore, according to one variant called "honeypot" variant, step (c) may again comprise the modification of the advertising packets, this time not out of being representative of vulnerabilities, but on the contrary representative of additional vulnerabilities.

It may seem paradoxical, but this voluntary positioning of vulnerabilities aims to knowingly "attract" the malicious third parties to neutralize them. It is indeed easy to identify them and then blacklist them in step (e') when they try to send a malicious request.

Gateway

According to a second aspect, the invention relates to a gateway 10 for the implementation of the method according to the first aspect.

The gateway is able to serve as a proxy between the objects 1, 2 and comprises, as explained, a data processing module 11 configured to:

Detect advertising packets broadcast by said server object 1;

Establish a first connection between the gateway 10 and said server object 1 so as to block the broadcasting by said server object 1 of advertising packets, and retrieve identification information from said server object 1;

Establish a second connection, between the gateway 10 and said client object 2, using as gateway 10 identification information said retrieved identification information of said server object 1, so as to simulate with the object client 2 a connection with the server object 1.

Can also be implemented as explained the prior broadcasting by the gateway 10 of advertising packets of said server object 1, as well as, after receiving from the client object 2 a data request intended for the server object 1, the forwarding of said request to the server object 1, the receipt from the server object 1 of a response to said request intended for the client object (2), and the forwarding of said response to the client object 2, or if the request is determined as malicious, the interruption of the second connection and possibly the registration of the client object 2 in a blacklist.

Computer Program Product

According to a third and a fourth aspect, the invention relates to a computer program product comprising code instructions for the execution (on a data processing module 11, particularly that of the gateway 1) of a method, according to the first aspect of the invention, for wireless communication between a client object 2 and a server object 1, as well as storage means readable by computer equipment (for example the memory 12 of the gateway 10) on which there is this computer program product.

The invention claimed is:

1. A method for wireless communication between a client object and a server object, wherein the method comprises implementation by a proxy of:
    (a) detecting advertising packets broadcast by the server object;
    (b) establishing a first connection between the proxy and the server object, the first connection blocking the broadcasting by the server object of advertising packets, and retrieving identification information from the server object; and
    (c) establishing a second connection between the proxy and the client object, by using as proxy identification information the retrieved identification information of the server object, the second connection simulating with the client object a connection with the server object,
    wherein (c) comprises broadcasting advertising packets from the server object by the proxy by using the retrieved identification information.

2. The method according to claim 1, comprising (d) receiving from the client object a data request intended for the server object.

3. The method according to claim 2, comprising (e) forwarding the request to the server object, receiving from the server object a response to the request intended for the client object, and forwarding the response to the client object.

4. The method according to claim 3, wherein (d) comprises verifying that the request is not malicious, and wherein (e) is implemented only if the request is not malicious, the method otherwise comprising (e') interrupting the second connection.

5. The method according to claim 4, wherein (e') comprises registration of the client object in a blacklist.

6. The method according to claim 1, wherein the wireless communication complies with the Bluetooth Low Energy, BLE protocol, so that the first connection and second connection are BLE connections.

7. The method according to claim 1, wherein (b) comprises searching for possible vulnerabilities at a level of the server object.

8. The method according to claim 1, wherein the advertising packets of the broadcasting by the proxy in (c) are modified so as to be representative either of an absence of vulnerabilities, or of additional vulnerabilities.

9. A proxy for wireless communication between a client object and a server object, wherein the proxy comprises:
- a processor; and
- a non-transitory computer-readable medium comprising instructions stored thereon which when executed by the processor configure the proxy to:
  detect advertising packets broadcast by the server object;
  establish a first connection between the proxy and the server object, the first connection blocking the broadcasting by the server object of advertising packets, and retrieve identification information from the server object; and
  establish a second connection between the proxy and the client object, by using as proxy identification information the retrieved identification information of the server object, the second connection simulating with the client object a connection with the server object,
  wherein establishing the second connection comprises broadcasting of advertising packets from the server object by the proxy by using the retrieved identification information.

10. A non-transitory computer-readable storage medium on which a computer program product is stored that comprises code instructions for execution of a method for wireless communication between a client object and a server object, when the instructions are executed by a processor of a proxy, wherein the method comprises:
  (a) detecting advertising packets broadcast by the server object;
  (b) establishing a first connection between the proxy and the server object, the first connection blocking the broadcasting by the server object of advertising packets, and retrieving identification information from the server object; and
  (c) establishing a second connection between the proxy and the client object, by using as proxy identification information the retrieved identification information of the server object, the second connection simulating with the client object a connection with the server object,
  wherein establishing the second connection comprises broadcasting advertising packets from the server object by the proxy by using the retrieved identification information.

\* \* \* \* \*